UNITED STATES PATENT OFFICE.

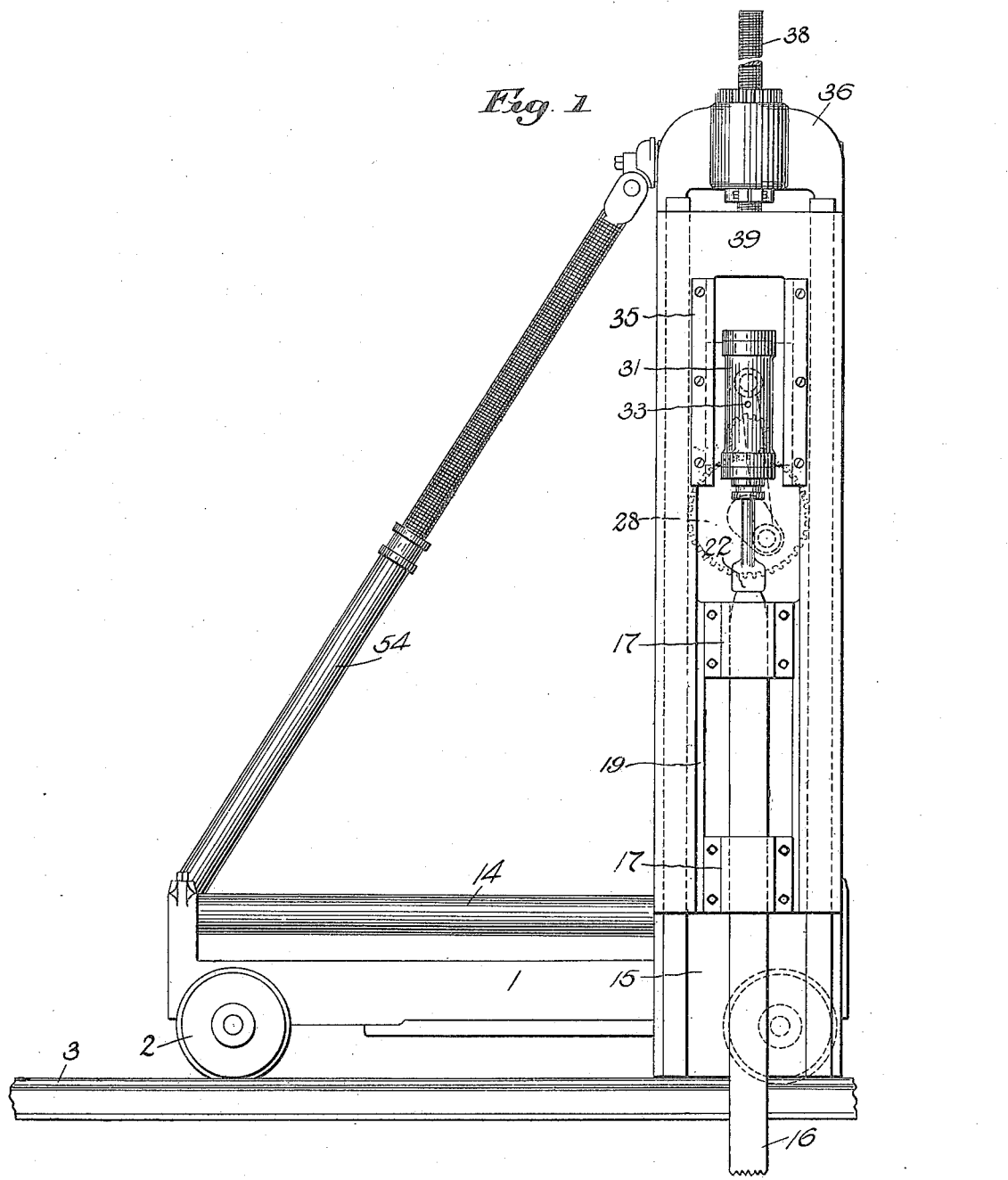

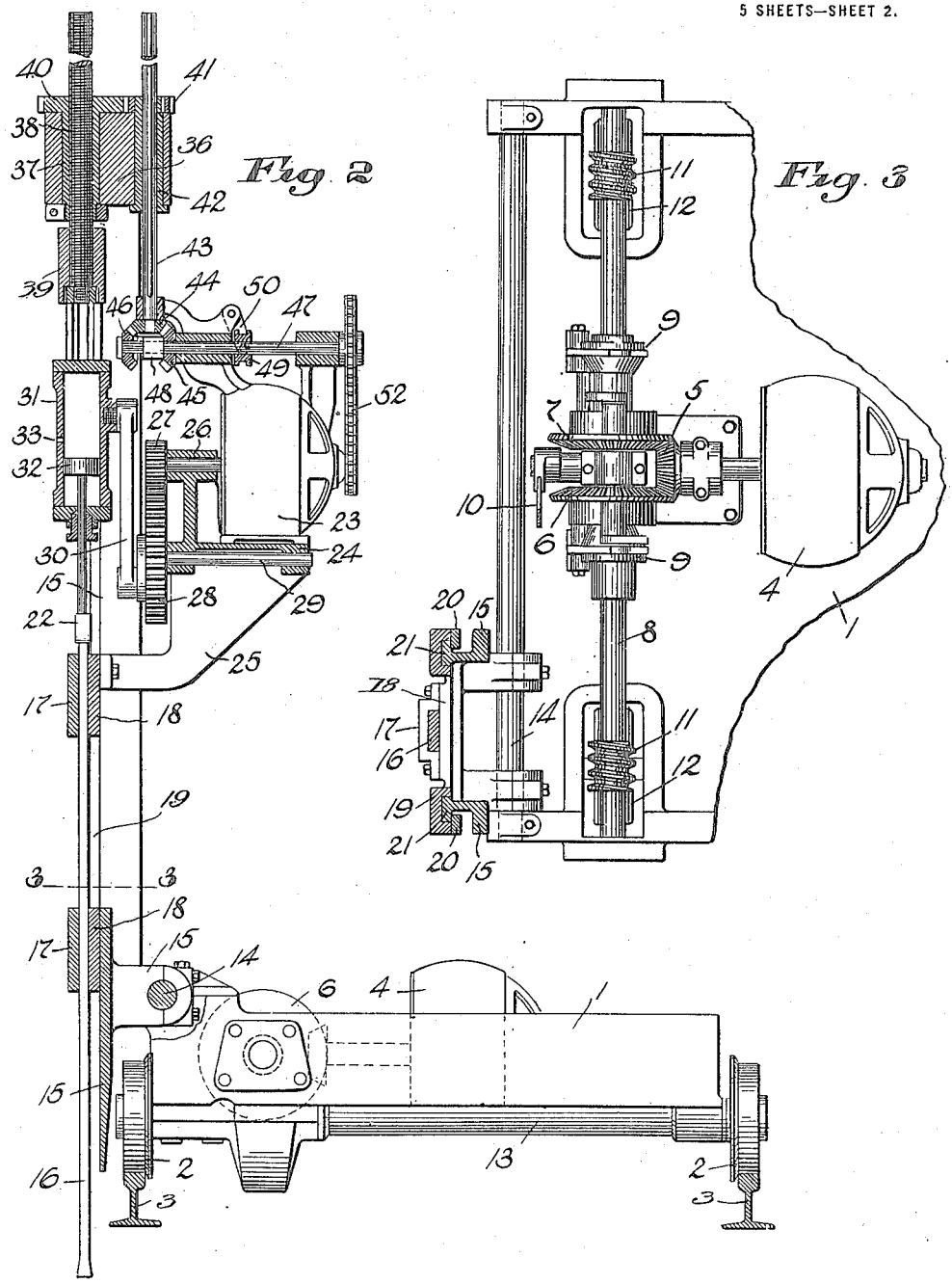

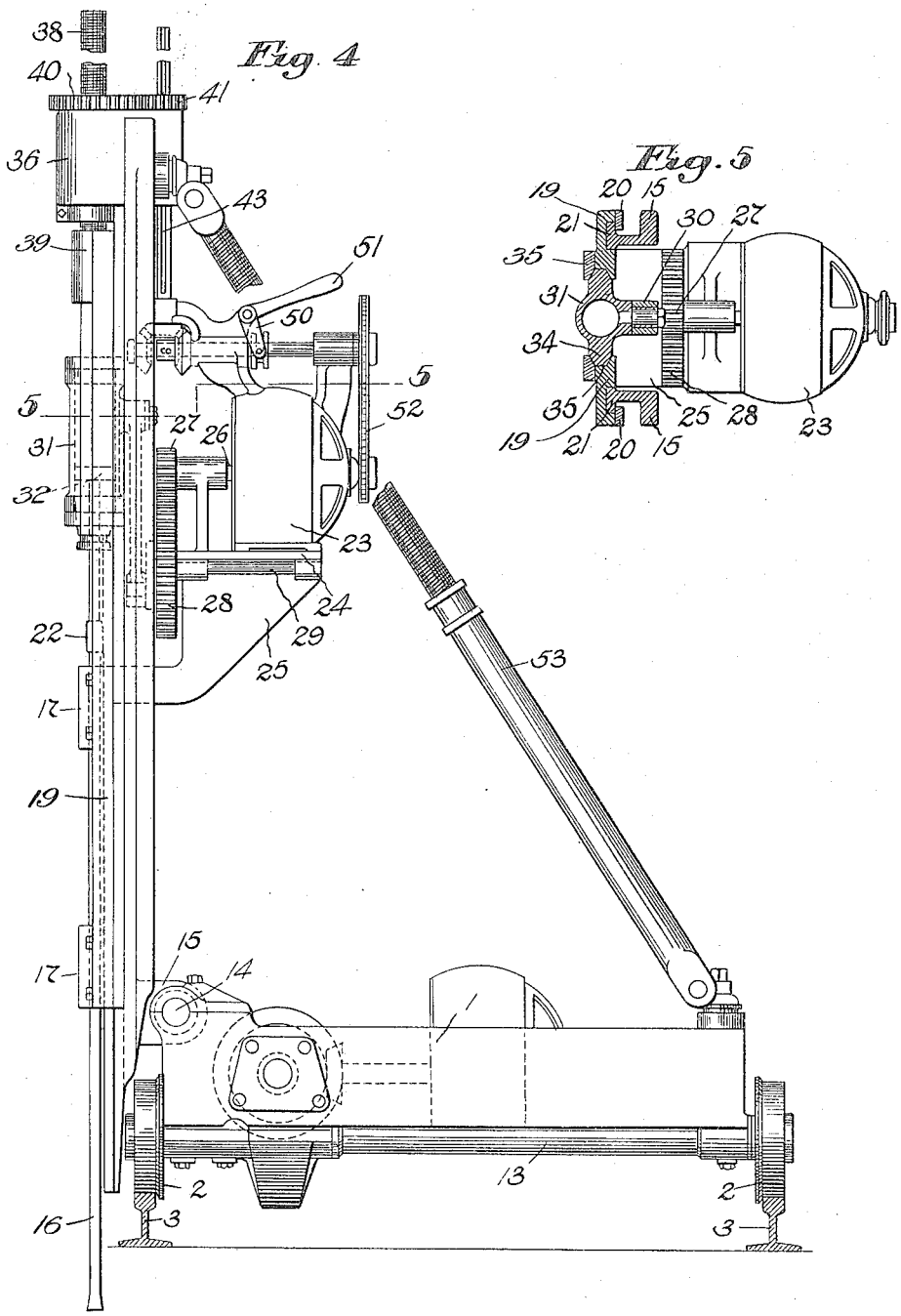

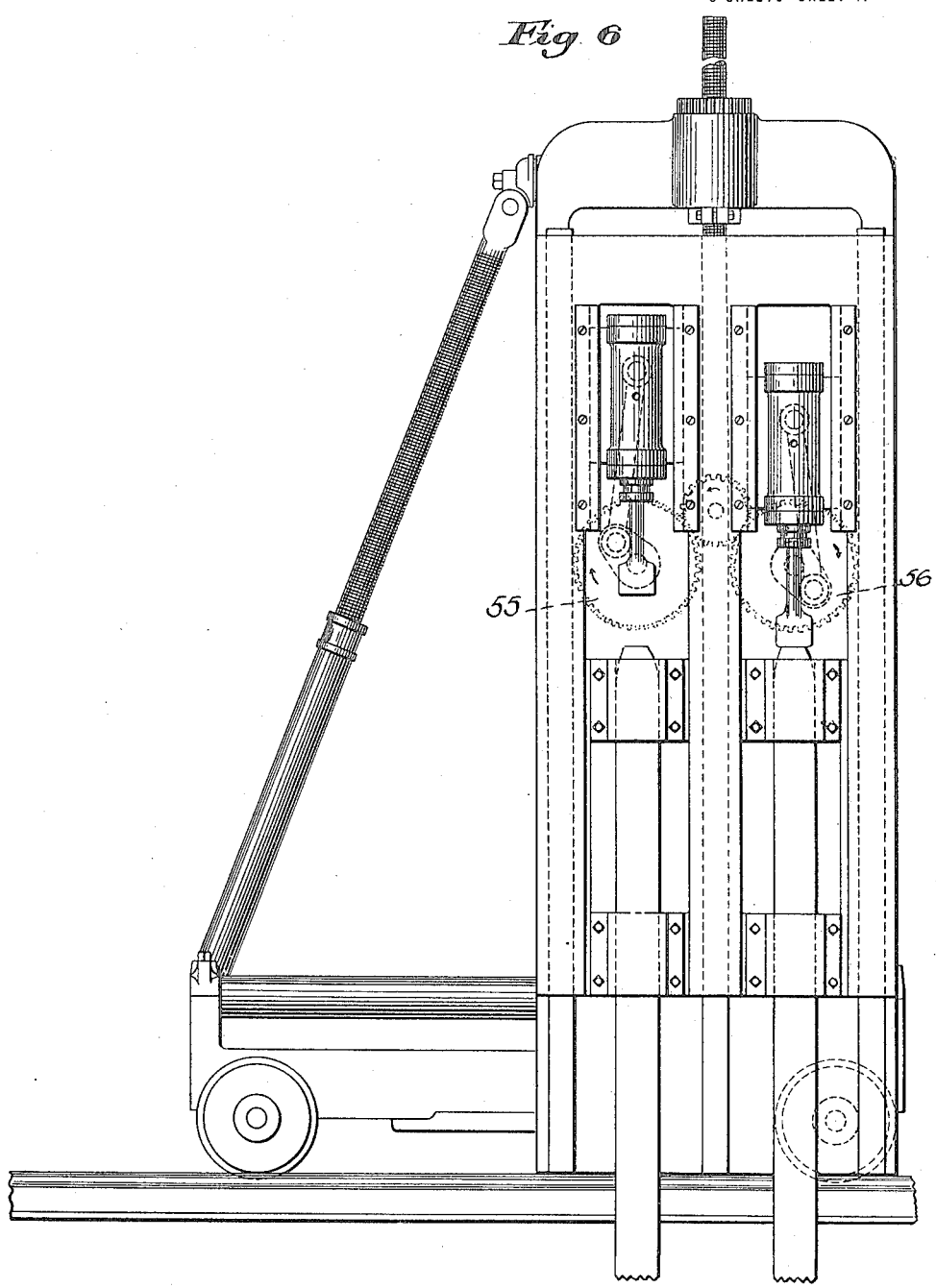

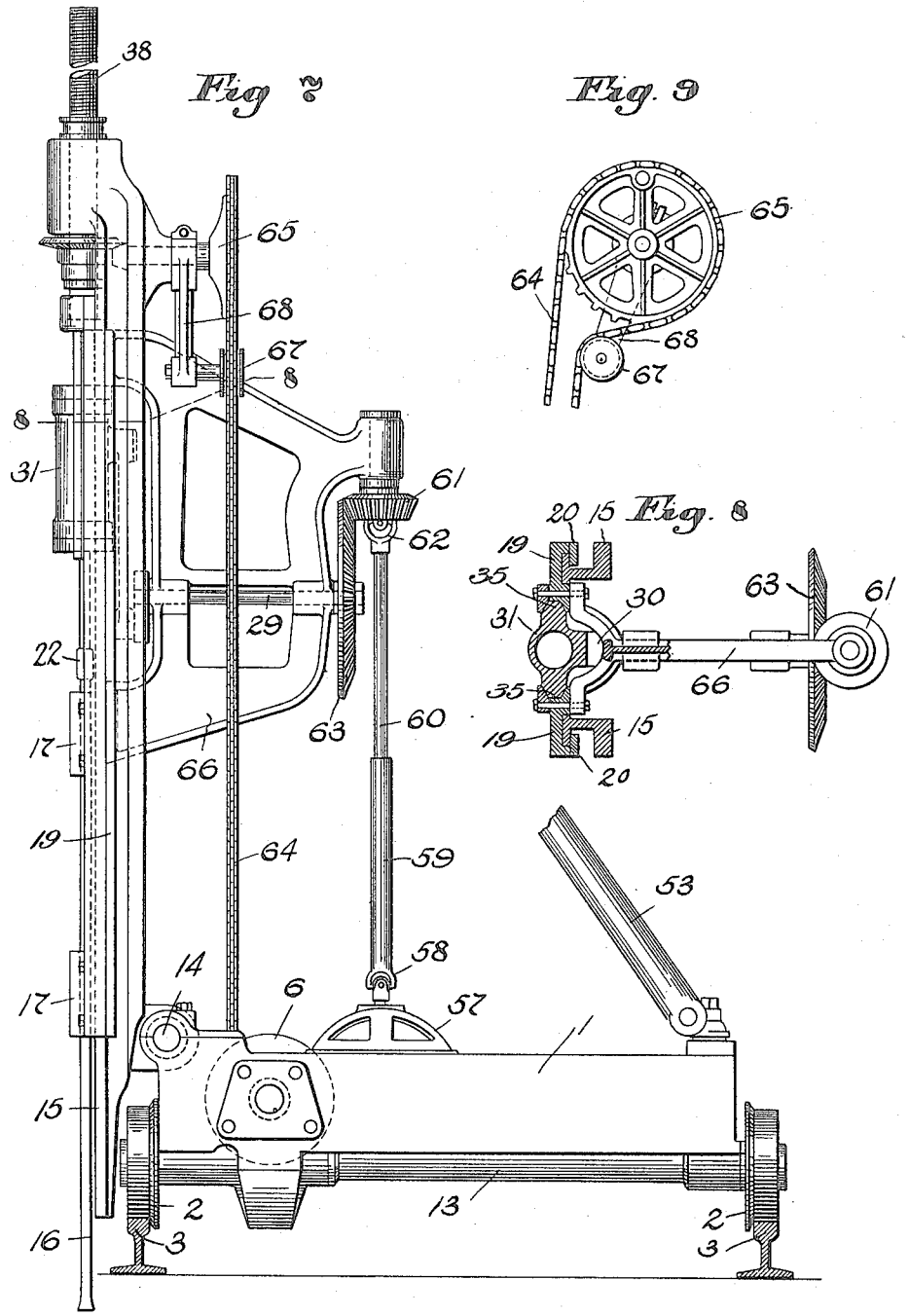

THOMAS OFFICER AND HENRY H. MERCER, OF CLAREMONT, NEW HAMPSHIRE, ASSIGNORS, BY MESNE ASSIGNMENTS, TO SULLIVAN MACHINERY COMPANY, OF BOSTON, MASSACHUSETTS, A CORPORATION OF MASSACHUSETTS.

STONEWORKING-MACHINE.

1,206,358.     Specification of Letters Patent.     Patented Nov. 28, 1916.

Application filed January 2, 1908. Serial No. 408,965.

*To all whom it may concern:*

Be it known that we, THOMAS OFFICER and HENRY H. MERCER, both citizens of the United States, and residents of Claremont, in the county of Sullivan and State of New Hampshire, have invented an Improvement in Stoneworking-Machines, of which the following description, in connection with the accompanying drawings, is a specification, like letters on the drawings representing like parts.

Our invention relates to stone working machines, and while more particularly, though not exclusively, intended for, and herein shown as applied to a quarrying machine of the channeler type, the same may have various other applications not herein referred to but coming within the spirit of the invention.

The invention will be best understood by reference to the following description when taken in connection with the accompanying drawings showing one specific embodiment thereof, while its scope will be more particularly pointed out in the appended claims.

In the drawings, Figure 1 is a front elevation of a channeling machine embodying one form of our invention; Fig. 2 is a sectional elevation taken transversely through the principal working parts of the machine shown in Fig. 1; Fig. 3 is a sectional plan, partly broken away, taken on the line 3—3 in Fig. 2; Fig. 4 is an end elevation of the same machine; Fig. 5 is a section in plan on the line 5—5 in Fig. 4; Fig. 6 shows a front elevation of a modified form of channeling machine; Fig. 7 shows a side elevation of another form of machine having the driving motor located in a different position; Fig. 8 is a section in plan on the line 8—8 in Fig. 7; and Fig. 9 is a detail showing the feeding chain in rear elevation.

Referring to the drawings and particularly to the embodiment of the invention shown in Figs. 1-5 inclusive, we have there shown the same as embodied in a track channeler having the main frame or body 1 supported upon the trucks 2, the latter adapted to track with the rails 3 customarily laid upon the bottom of the quarry. Any desired construction of the machine may be employed in respect to the carriage, but in the illustrative form we have shown the same as provided with a truck driving motor 4 mounted upon the frame and connected with a usual form of mechanism to drive the machine along the track-way in either direction at will. For this purpose the motor shaft is provided with a beveled pinion 5 meshing with the two oppositely driven beveled gears 6 and 7, either of which may be separately clutched to the worm shaft 8 by means of the double clutch member 9, the latter connected to be moved through the operating lever 10. In the position shown the gear 6 is clutched to drive the shaft 8 in the direction of its rotation. The shaft 8, in turn, drives the trucks by means of the worm 11, worm gears 12 and axles 13. At the working side of the machine there is provided a trunnion shaft 14, to which is adjustably clamped the standard 15 adapted to support the principal tool-working parts.

In machines of this class it is usual to provide one or more channeling tools directly connected to the tool-actuating medium, so that the tools themselves are caused to be reciprocated with such actuating medium. We have found that the cutting operation in a channeling machine is materially facilitated by holding the tools loose or substantially so against the stone, while permitting the tool-actuating medium to strike a hammer blow upon the ends of the tool. This not only acts to cut more rapidly, but so decreases the weight of the moving parts that the machine can be run at a higher and more effective speed and with a greatly simplified mechanical construction, permitting moreover, as in the present instance, the use of a simple and efficient actuating medium, which, with the ordinary construction of reciprocating channeling tool, cannot practically be availed of.

Referring to the drawings, the channeling tools are represented at 16, loosely held in guide members, the latter comprising caps 17 bolted to cross-members 18. The latter form part of a sliding frame 19, which is provided with gibs 20, and is mounted to slide vertically upon finished ways 21 formed upon the upright standard 15.

Upon the sliding frame 19 is mounted the tool-actuating medium, which, by means of the sliding movement given the frame, can be adjusted toward or from the work as the cut deepens. Any suitable form of tool-actuating medium may be employed, but in the present instance we have utilized a motor so connected as to give a reciprocatory movement to the hammer member 22, which latter is adapted to strike the upper end of the tool gang. While any suitable form of motor may be employed and such motor need not necessarily be mounted to move with the sliding frame, in the present instance we have utilized an electric motor 23 mounted upon a shelf 24 supported by the bracket 25, the latter rigidly secured to the frame 19 so as to move therewith. The motor shaft 26 has the driving pinion 27 meshing with the driven gear 28, the latter secured to the crank shaft 29, and to the shaft is secured the connecting rod 30, which is given a quick reciprocatory movement by the motor.

In order to provide a cushion between the reciprocatory driving support and the hammer 22 any suitable means may be employed, but in the described embodiment of our invention we have provided a pressure-fluid cushion, by connecting to the one part a cylinder and to the other part a coöperating piston, so that the blow is delivered from the motor to the hammer through an intervening cushion of air. In the present instance the connection 30 is pivotally attached to the cylinder 31, the latter having within it the working piston 32, the directly connected piston rod of which terminates in the hammer member 22. If desired, an artificially built-up pressure may be maintained within the cylinder in order to strike a harder and less elastic blow, but in the present instance the cylinder is provided with the opening 33 which is uncovered by the piston, on each stroke thereof and the atmospheric air admitted therethrough forms the intervening pneumatic cushion through which the hammer member is lifted as the cylinder ascends, or is depressed as the cylinder descends.

It has heretofore been attempted to employ a pneumatic cushion of the reciprocating cylinder-piston type in conjunction with the stone working tools, but, with the weight of the directly connected tools added to the weight of the cylinder and piston, the inertia of the moving parts and the strain is excessive, so that it is practically difficult to so construct such mechanisms as to preserve their necessary alinement under the conditions of practical quarry work.

In the present construction where the tools are reciprocatively detached from the actuating medium, a cushioning device of the general type described, may be readily employed in conjunction with an electric or other motor, thereby permitting the utilization of electric or other primary source of power directly at the tool-actuating medium and with the employment of a simplified apparatus for the conversion of that power into mechanical reciprocatory movement.

To properly guide and aline the reciprocating cylinder, the latter is provided (Figs. 1 and 5) with lateral webs 34 having beveled edges engaging with gibbed guide-ways 35 carried by the sliding frame 19. At its upper end the standard 15 terminates in the arched top 36 in which latter is journaled the interiorly threaded sleeve 37 engaging the threaded feed screw 38, the latter fixedly attached to the cross-piece 39 at the top of the sliding frame, so that as the sleeve 38 is turned the feed screw is raised and lowered and the frame, with its sustained tool-actuating element, raised and lowered. To the top of the sleeve is attached the gear 40 meshing with the pinion 41, the latter in turn being secured to the sleeve 42 splined on the upright driving shaft 43. The shaft 43 carries at its lower end the beveled pinion 44 meshing with the beveled gears 45 and 46 which are loose upon the transverse shaft 47, but adapted to be separately clutched to a collar 48 thereon. The latter has sliding connection through a rod (not shown) within the shaft 47 with the grooved collar 49, which latter is engaged by the yoke 50 and thereby connected to the operating lever 51. The transverse shaft 47 is driven from the tool-actuating motor 23 by means of the connecting chain 52 and the inter-meshing sprocket wheel shown, it being, therefore, possible by means controlled by the handle 51 to raise or lower the sliding frame or hold it stationary at will.

The standard 15 is secured at its upper end to the rearwardly extending brace-rod 53, the opposite end of which is attached to the carriage body 1 and also to the laterally inclined brace-rod 54. The brace-rod 53, as is usual, may be shortened or lengthened to permit the tipping adjustment of the standard about the trunnion shaft for angle cutting, and the brace-rod 54 may be removed and its position reversed with respect to the carriage and the standard when the latter is adjusted for cutting at the opposite end of the machine.

The channeler described has the advantage of lightness and permissible rapidity of operation due to the low inertia of the moving parts, but these advantages may be further increased, if desired, while, at the same time, increasing the cutting efficiency of the machine, by providing a plurality of channeling units of the type disclosed. Referring to Fig. 6 we have there shown a channeling machine of substantially the same construction as that already described excepting that the sliding frame is enlarged to accommodate two tool-actuating units of the character described, adapted to work side by side but preferably in opposed step, so that as one moves up the other moves down. This tends largely to neutralize the reactionary shock of the down movement of one hammer by the shock of the up movement of the other, thereby not only taking off considerable strain from the mechanism but permitting a higher speed of operation.

In the duplex channeler shown in Fig. 6 movement may be transmitted from a single motor and driving pinion, as before, to the two inter-meshing gears 55 and 56 which are connected to their respective tool-actuating cylinders by means of crank connections set 180° apart.

In Figs. 7-9 we have shown a form of machine wherein the tool-supporting element is made considerably lighter by placing the tool-reciprocating motor 57 directly upon the truck instead of mounting the same to move with the sliding frame, as in the described modification. Here we have shown a single motor 57 utilized both for driving the truck and reciprocating the tool, the same being placed with its motor shaft in an upright position and connected by the universal coupling 58 with one part 59 of a telescopic driving shaft, the other part 60 being connected to the bevel gear 61 by means of a second universal coupling 62. The bevel gear 61 meshes with the gear 63, which latter is secured to turn the crank shaft 29, as in the case of the previously described machine. The telescopic and universally connected driving shaft permits the adjustment of the sliding frame toward or from the work without interfering with the driving connection between the motor and the crank shaft, and as readily permits the adjustment of the standard to either end of the machine, the motor being preferably located at about a mid position lengthwise the truck.

The motor 57 may, as before, be utilized to feed the tool-actuating unit toward or from the work by means of the sprocket chain 64, the latter connected to a suitable driving member (not shown) upon the truck, and its upper end to the sprocket wheel 65, which latter acts, through a usual construction of tool-feeding mechanism, to raise or lower the sliding frame. The sprocket chain 64 is caused to clear the bracket 66 upon the sliding frame by engagement with the idle sprocket wheel 67 carried by the adjustable arm 68, the said sprocket wheel acting to take up slack in the said chain.

While we have shown and described one form of our invention it is to be understood that the same is not limited to the details of construction or the specific application herein made thereof, or to the particular means by which the principles of the invention are disclosed or carried out, but that extensive modifications may be made in the disclosed type of the invention without departing from the spirit thereof.

Claims.

1. In a channeling machine the combination with a truck, a standard mounted at the side thereof and adjustable to a position adjacent either end of said truck, a sliding frame upon said standard, a reciprocatory hammer member and a reciprocatory driving part both mounted upon said frame, a coöperating piston and cylinder connected the one to the hammer member and the other to the driving part, means for loosely guiding a tool gang, the latter non-reciprocatively related to the said hammer, an electric motor connected to drive said reciprocatory driving part and also mounted upon said frame, moving means for raising or lowering said frame upon said standard and connections between said moving means and said motor.

2. In a channeling machine the combination with a traveling truck, a standard mounted at the side thereof and adjustable to a position adjacent either end, means for loosely guiding a tool gang, a sliding frame upon said standard, a hammer member for striking the tool gang a hammer blow, a reciprocatory driving part upon said frame, a coöperating piston and cylinder connected the one to the hammer member and the other to the driving part, and a driving motor for said driving part also mounted upon said frame.

3. In a channeling machine the combination with a traveling truck, a standard mounted at the side thereof, means for loosely guiding a tool gang, a sliding frame upon said standard, a hammer member for striking the tool gang a hammer blow, a driving motor and a coöperating piston and cylinder connected between the driving motor and the hammer member to interpose a pneumatic cushion.

4. A tool-actuating device comprising a standard, a plurality of hammer members upon said standard, means for driving said hammer members in opposed step, and means for maintaining a pressure-fluid cushion between said driving means and said hammer members.

5. In a channeling machine, the combination with a truck, a standard mounted at the side thereof, and adjustable to a position adjacent either end of the truck, a sliding frame upon said standard, a pair of reciprocatory hammer members each with its reciprocatory driving part, both mounted upon said frame, a coöperating piston and cylinder connected, one to the hammer member and the other to the driving part, means loosely guiding a tool gang, the latter non-reciprocatively related to the said hammer, an electric motor connected to drive said reciprocatory driving parts in opposed step, and means for raising and lowering said frame upon said standard.

6. In a channeling machine, the combination with a wheeled truck, a standard mounted at the side thereof and adjustable to a position adjacent either end of said truck, a sliding frame upon said standard, a reciprocatory hammer member and a reciprocatory driving part both mounted upon said frame, a coöperating piston and cylinder connected, the one to the hammer member and the other to the driving part, means for loosely guiding a tool gang, the latter non-reciprocatively related to the said hammer, an electric motor connected to said reciprocatory driving part, means for raising or lowering said frame upon said standard, and connections between said raising and lowering means and said motor.

7. In a channeling machine, the combination with a wheeled truck, a standard mounted at the side thereof and adjustable to a position adjacent either end of said truck, a sliding frame upon said standard, a reciprocatory hammer member and a reciprocatory driving part both mounted upon said frame, a coöperating piston and cylinder connected, the one to the hammer member and the other to the driving part, means for loosely guiding a tool gang, the latter non-reciprocatively related to the said hammer, an electric motor connected to said reciprocatory driving part, and means for raising or lowering said frame upon said standard.

8. In a channeling machine the combination with a wheel truck, a standard mounted at the side thereof, a sliding frame upon said standard, an electric motor carried by said sliding frame, a reciprocatory hammer member and a reciprocatory driving part mounted on said frame and actuated by said motor, a coöperating piston and cylinder connected the one to the hammer member and the other to the driving part, means for loosely guiding a tool gang, the latter non-reciprocatively related to the said hammer, and means for raising or lowering said frame upon said standard.

9. In a channeling machine the combination with a wheel truck, a standard mounted at the side thereof and adjustable to a position adjacent either end of said truck, a sliding frame upon said standard, a plurality of hammer members upon said frame, a reciprocatory driving member for each hammer, a coöperating piston and cylinder also for each hammer connected the one part to the hammer member and the other to the driving part, means for loosely guiding a plurality of tool gangs, the latter non-reciprocatively related each to a hammer, means for actuating the reciprocatory driving parts, and means for raising or lowering said frame upon said standard.

10. In a channeling machine the combination with a base of an upright standard pivotally mounted on said base at the side thereof, a sliding frame upon the standard, a motor carried by said sliding frame, a reciprocatory hammer member and a reciprocatory driving part mounted on said frame and actuated by said motor, a coöperating piston and cylinder connected one to the hammer member and the other to the driving part, and means for loosely guiding a tool gang non reciprocatively related to the said hammer.

In testimony whereof, we have signed our names to this specification, in the presence of two subscribing witnesses.

THOMAS OFFICER.
HENRY H. MERCER.

Witnesses:
E. J. BURCHARD,
L. W. HALL.

Copies of this patent may be obtained for five cents each, by addressing the "Commissioner of Patents, Washington, D. C."